United States Patent [19]

Stanfield

[11] Patent Number: 4,786,096

[45] Date of Patent: Nov. 22, 1988

[54] DISH CARRIER

[76] Inventor: John Stanfield, 425 Riverhill Dr., Atlanta, Ga. 30328

[21] Appl. No.: 90,548

[22] Filed: Aug. 28, 1987

[51] Int. Cl.⁴ ............................................. B25H 3/04
[52] U.S. Cl. .................................... 294/137; 194/143; 194/161
[58] Field of Search ............... 294/137, 143, 158, 161, 294/144, 172, 159, 160, 162, 163; 211/41, 49.1, 126, 184, 187, 188, 175, 207; 220/23.6, 23.8, 23.83, 23.86, 19, 95; 206/503, 504, 510

[56] References Cited

U.S. PATENT DOCUMENTS 953,007 3/1910 Haller .
1,065,633 6/1913 Stone .
1,519,874 12/1924 Page .
1,888,141 11/1932 Orth .
2,087,375 7/1937 Ehrhardt ............................... 224/45
4,385,781 5/1983 Welsch et al. ........................ 294/143

Primary Examiner—James B. Marbert
Attorney, Agent, or Firm—Thomas & Kennedy

[57] ABSTRACT

A dish carrier for transporting and storing a stack of dishes comprises a base from the periphery of which a set of resilient wire arms upwardly extends. A cover is slidably mounted onto the arms and a handle releasibly attachable to the ends of two opposing arms. So constructed, dishes may be stacked upon the base and maintained in their stacked configuration by the upright arms and the cover passed downwardly over the arms and onto the top of the stack of dishes.

16 Claims, 3 Drawing Sheets

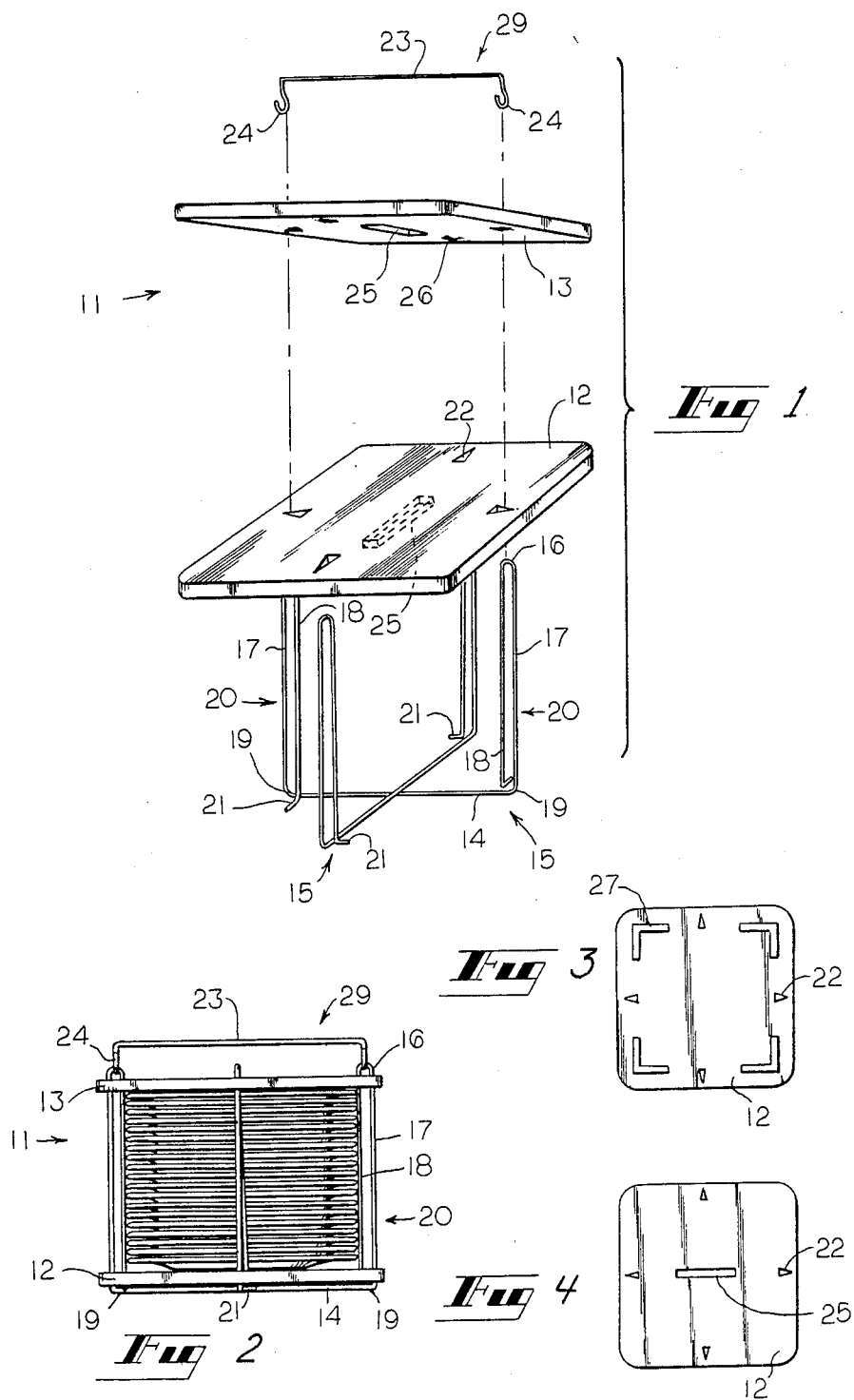

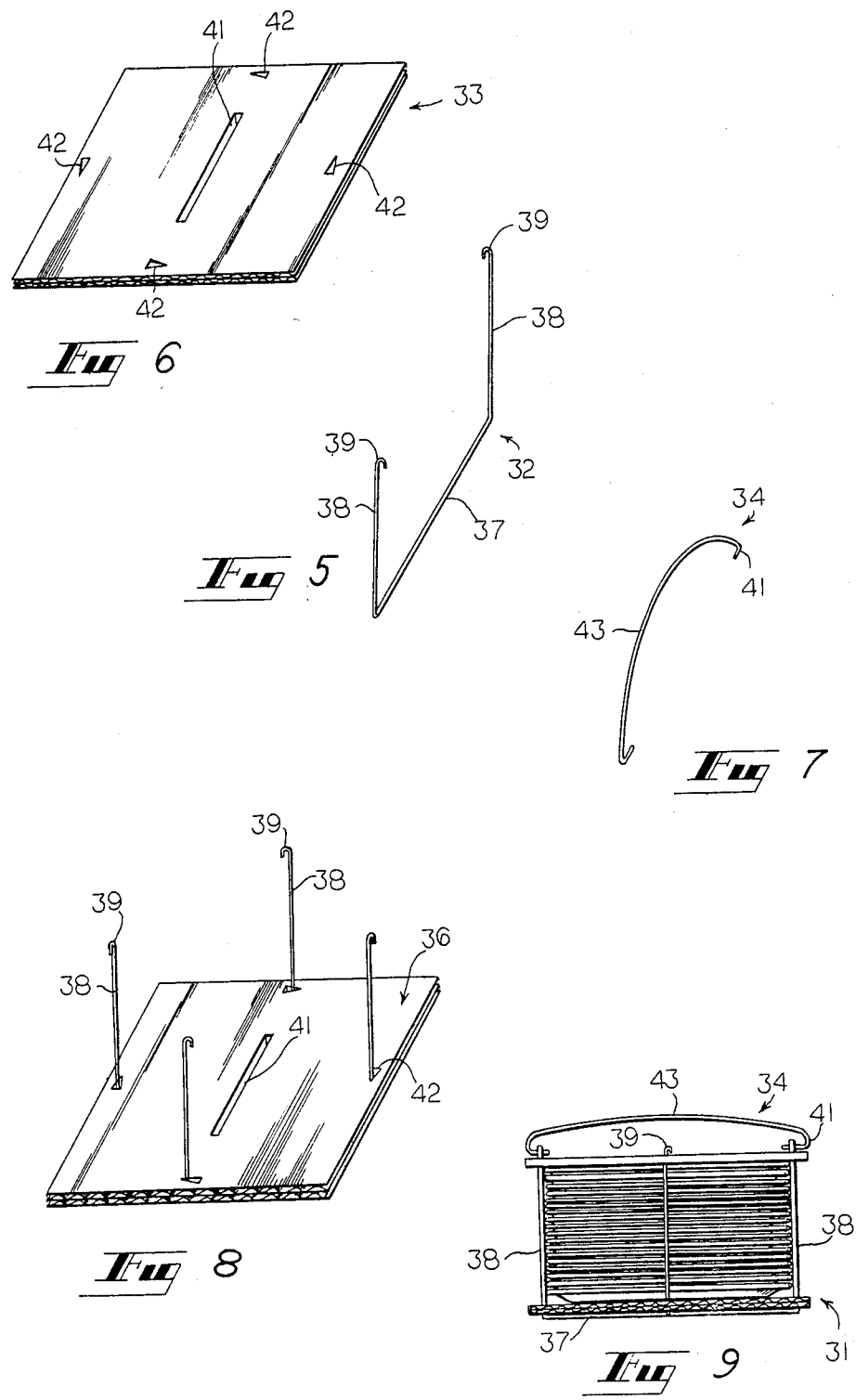

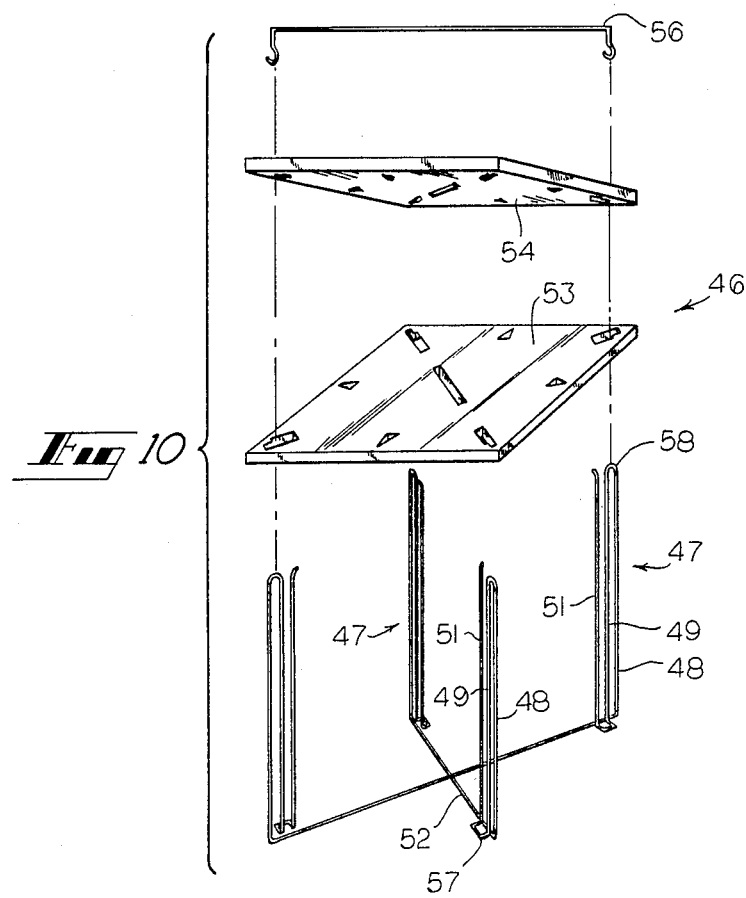
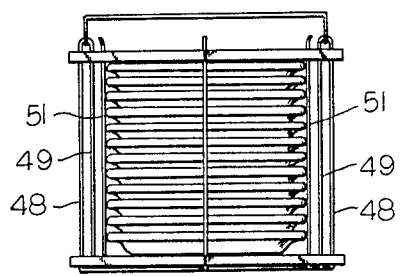 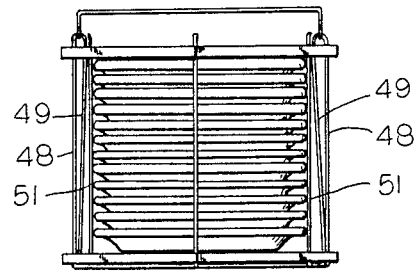

DISH CARRIER

TECHNICAL FIELD

The present invention relates to carrying devices and more particularly to a device for carrying a stack of plates or dishes.

BACKGROUND OF THE INVENTION

It is common in the restaurant, tableware rental, food catering and moving industries for large numbers of plates or dishes to be stored and transported in stacks for economy of space and handling efficiency. Considerable difficulty can be encountered in handling stacks of dishes because they are fragile, heavy and cumbersome to handle. As a consequence, dishes are often dropped and breakage is common.

Previous attempts to solve the problems associated with transporting and storing large numbers of dishes have met only limited success. U.S. Pat. No. 2,087,375 of Ehrhardt exemplifies such prior art devices. It describes a carrying device having a plurality of upright staves connected by horizontal flexible members with a handle attached to the top of two of the upright staves. To use this type of carrying device, a number of plates are stacked on a surface and the device is wrapped around the stack and fastened with latches attached to two of the upright staves.

Not only are devices of this type bulky and difficult to store, they require that plates be stacked on a surface before the device is applied. Wrapping such a device around a stack of plates however can be manually difficult and can cause the stack of plates to topple and break. Moreover, the flexible connecting members of the device itself tends to obscure the plates making it difficult to inspect or count them without removal from the carrying device.

Plate racks such as those illustrated in U.S. Pat. Nos. 953,007 of Haller and 1,888,141 of Orth can be used to carry a set of dishes or plates. They, however, are designed for carrying plates of food to be served with the plates spaced from each other and thus not compactly arranged in stacks.

Accordingly, it is seen that a need exists for a dish carrier by which a stack of dishes or plates may be easily transported and stored in a simple and economic manner with minimal risk of breakage. It is to the provision of such that the invention is therefore primarily directed.

SUMMARY OF THE INVENTION

The present invention is a lightweight, versatile dish carrier for transporting and storing a stack of dishes or plates. In a preferred embodiment the dish carrier has a base made of plastic or other sturdy material formed with arm receiving holes around its edges. Two generally U-shaped, wire posts having double stranded upright arms connected by a bight portion extend from the bottom of the base upwardly through the arm receiving holes so that their bights cross on the underside of the base and their arms extend upwardly from an upper surface of the base adjacent its edges. A cover is provided that has substantially the same shape as the base and that also has arm receiving holes located adjacent its edges which may be passed downwardly to receive the wire arms so that the cover is slidable on the arms toward and away from the base. To insure that the carrier may be supported securely on a support surface, a set of feet may be formed on the bottom of the base that project downwardly below the crossing bight of the two wire posts. Alternatively, a slot or groove may be formed in the bottom of the base extending between two of the arm receiving holes to receive the bight of one of the posts so that the crossing of the two bight portions does not create a bulge at their crossings.

Each upright arm has an outer strand located proximally to the base periphery and an inner strand located distally to the base periphery and spring biased away from the outer strand by the inherent resiliency of the wire. The inner strands of the upright arms have a free end adjacent the base and lie generally in a circle that is the same diameter as a stack of plates to be carried. With this construction, when a stack of plates is passed down between the posts and onto the base, the inner strands of the posts hold it firmly in place. The cover may then be slid down over the wire posts to rest atop the stack of plates. The arm receiving holes in the cover force the outer strands of the wire posts to maintain a position parallel to each other while the flexibility of the inner strands causes them to maintain pressure against the stack of plates. Because the inner stands are free at the bottom and connected to the outer strands at the top, this pressure is progressively greater toward the top of the stack tending to press the stack downward against the base, further insuring stability. A handle, which is releasibly attachable to the upper ends of two of the wire posts, may then be attached so that the carrier securely holding the stack may be hand carried.

In an alternate embodiment, a disposable form of the dish carrier is provided in which the base and the cover are made from a quite inexpensive material such as cardboard. In this embodiment the wire posts are single stranded and have a hook formed at their top ends. A number of dishes are stacked on the base such that when the cover is placed over the posts and onto the top of the stack, the edges of the cover in the area of its arm receiving holes may be depressed slightly allowing the hooks to be moved laterally over the top of the cover so that when the depressed edges are released, the hooks dig into the top of the cardboard cover holding it in place atop the stack. A handle may then be attached to two of the posts. This embodiment is particularly useful for manufacturing companies that package large numbers of plates of the same size. They may place filled carriers into cartons for shipment which may be removed at their destination for counting, inspecting, and storage.

A third embodiment is similar to the first but has three-stranded arms extending upwardly from the base instead of two-stranded arms. In this embodiment, the inner and outer strands remain parallel and the center strand is skewed in response to dishes being stacked between the arms. In this way, the inner strands are maintained in firm contact with the stack of dishes and a greater range of dish sizes can be accommodated by a single size carrier.

In none of the embodiments need horizontal connecting members necessarily extend between the posts about the stack. Therefore, dishes may be inspected and counted without removing them from the dish carriers. For display and sale of the carriers themselves the wire posts and handles may simply be laid between the base and cover forming a compact package that may be wrapped, labeled, and displayed.

BRIEF DESCRIPTION OF THE DRAWING

FIG. 1 is an exploded view, in perspective, of a dish carrier in one preferred embodiment.

FIG. 2 is a side elevation view of the dish carrier of FIG. 1 shown assembled and holding a set of dishes.

FIG. 3 is a bottom view of an alternative form of the base member of the dish carrier of FIGS. 1 and 2.

FIG. 4 is a bottom view of the dish carrier shown in FIG. 2.

FIG. 5 is a perspective view of one wire post member of a second preferred embodiment of the dish carrier.

FIG. 6 is a perspective view of the base of the second embodiment.

FIG. 7 is a perspective view of the handle of the second embodiment.

FIG. 8 is a perspective base of the second embodiment shown with the wire posts mounted to the base.

FIG. 9 is a side elevation view of the second embodiment shown assembled and holding a set of dishes.

FIG. 10 is an exploded view, in perspective, of a third preferred embodiment of the dish carrier.

FIG. 11 is a side elevational view of the dish carrier of FIG. 10 filled with dishes of a first diameter.

FIG. 12 is a side elevation view of the dish carrier of FIG. 10 filled with dishes of a second diameter.

DETAILED DESCRIPTION

Referring now in more detail to the drawings in which like numerals indicate like parts throughout the several views, FIG. 1 is an exploded view showing a dish carrier 11 having a base 12 and a cover 13 of identical structure. A pair of U-shaped wire posts 15 are each seen to have a bight portion 14 that unitarily links together two double stranded arm portions 20. Each of the arms has an outer strand 17 and an inner strand 18 joined at a U-shaped bend 16 at the top end of the arm. The outer strands 17 meet with the bight 14 at L-shaped bends 19. Each inner strand 18 extends downwardly from the U-shaped bend 16 substantially parallel to the outer strand 17 to an L-shaped free end 21 located near the bend 19.

The base 12 is seen to have four triangular holes 22 formed therein and located such that the double stranded arms may be extended from the bottom of the base upwardly through the holes 22 such that they fit snuggly within the apexes of the triangular holes. As the cover 13 is identical to the base 12, it may be passed downwardly onto the top of a stack of dishes or plates supported on the base with the wire posts 20 extending through the holes 26.

A bight accepting slot 25 is formed in the bottom of the base 12. This slot is oriented and positioned between two of the holes 22 so as to accept a central portion of the bight of one of the U-shaped wire posts so that it may reside in the slot above the lower surface of the base 12. This serves to prevent a bulge from being formed at the point where the two bights of the two U-shaped posts cross. The slot 25 in the cover 13 is non functional.

The dish carrier also has a generally U-shaped handle 29 that has a bight 23 and two arms formed with hooks 24. The hooks 24 are adapted to be attached to the U-shaped bends 16 of the arms 20 which extend above the upper surface of the cover 13. In this way, the dish carrier may be hand carried from place to place by connecting the hooks 24 to the U-shaped bends 16 and lifting the dish carrier and stack of dishes therein with the cover pressed down upon the stack.

FIG. 2 shows the dish carrier 11 in its assembled carrying configuration with a stack of dishes nested between the base 12, the cover 13 and the posts 20. The handle 29 is shown releasibly connected to the bend 16 of the posts 20 via the hooks 24. The dishes in FIG. 2 are of a diameter such that they just contact the inner strands 18 and are held firmly therebetween. Dishes of a slightly larger diameter can also be stacked in the carrier. This causes the inner strands 18 to flex outwardly slightly and to bend at bend 16 applying more pressure to the top plate of the stack than to the bottom plate. This uneven pressure tends to hold the stack of dishes firmly against the base 12. Alternately, to accommodate slightly larger plates the cover can be provided with arm receiving holes of a slightly larger size than those of the base allowing the outer arms to bend outwardly at bend 19 maintaining the inner strands parallel and in firm engagement with the stack of plates.

FIG. 3 shows an alternate form of the carrier base. Here, four feet 27 are formed on the bottom of the base which extend downwardly from the base to a point below the crossing of bights 14. The dish carrier may thus be placed upon a flat surface and supported upon feet 27 with the bight portions 14 of the wire rods located between the surface and the base 12 not causing the carrier to wobble.

FIGS. 6-9 show an alternate embodiment of the dish carrier designed for temporary or one-time use. Here, the carrier has a cover 33 and a base 36 which are constructed from a lightweight, inexpensive matrial such as cardboard. For ease of assembly and economy of manufacture, the base 36 and the cover 33 are identical with each having four holes 42 formed adjacent their peripheries. Extending partway between two of the holes is an elongated slot 41. The carrier also has a pair of generally U-shaped wire frames or posts having a linear bight 37 and two generally parallel arms 38. The arms are adapted to be passed through the holes 42 in the base so that they extend upwardly from the base 36, as shown in FIG. 8. The upper ends of the arms are formed with inverted J-shaped hooks 39 that are oriented parallel to an adjacent edge of the cover 33. A central portion of the bight 37 of one of the U-shaped frames rests within the slot 41 so that the bight of the other U-shaped frame may cross over it while remaining linear so that a bulge is not formed by the crossing bights.

Once a stack of dishes is placed upon the base between the arms, the cover may be slid over the ends of the arms and onto the top of the stack. With a proper number of dishes stacked on the base, the upper surface of the cover is slightly above the hook portions of the arms. The periphery of the cover may then be depressed slightly in the area of the holes 42 and the hooks moved laterally to overlap the edge of holes 42. By then releasing the cover it will recoil causing the hooks to become partially embedded in the cardboard so that the cover is then held firmly down against the top of the stack of plates. A handle 34 formed of resilient wire having a curved portion 43 and generally inwardly oriented end hooks 41 may then be coupled to the ends of two of the arms, as shown in FIG. 9, through the portions of the hooks that have remained not embedded in the cardboard cover. This serves not only to provide means for hand carrying the stack but also insures that the cover remains held tightly down on the stack.

A third embodiment of the dish carrier is shown in FIGS. 10 through 12. In this embodiment, dish carrier 46 has a base 53, a cover 54 and a handle 56 similar to the first embodiment. Upright wire posts 47 are formed to have three arm strands in this embodiment; an outer strand 48, an inner strand 51 and a central strand 49, as shown. The outer strand and central strand extend from a bend 58. The central strand and inner strand extend from another bend 57. Bend 57 is bent laterally, as shown, to provide further support for the base 53.

When dishes of a diameter just equal to the space between opposing inner strands are stacked between the post arms, as shown in FIG. 11, the inner strands of the arms maintain constant pressure on the stack of plates, holding them in place. Dishes of a larger diameter can be stacked in which case the arms automatically compensate by virtue of the center strand skewing, as shown in FIG. 12, maintaining the inner strands parallel with respect to each other and in firm contact with the stack of dishes. In this way, a single dish carrier design can accommodate a wide range of dish sizes.

It thus is seen that a dish carrier is now provided which overcomes problems and limitations long associated with those of the prior art. Although the invention has been described in the form of two preferred embodiments, many modifications, additions and deletions may be made thereto without departing from the spirit and scope of the invention as set forth in the claims.

I claim:

1. A dish carrier comprising a base and a pair of generally U-shaped, resilient wires each having two generally parallel arms that extend from a connecting bight, said pair of wires being mounted to said base with said wire bights extending mutually transversely along a bottom surface of said base and with said wire arms extending upwardly from an upper surface of said base adjacent a periphery thereof whereby dishes may be stacked upon the base and held by the arms of the resilient wires.

2. A dish carrier as claimed in claim 1 further comprising a cover adapted to a slidably mounted to said wire arms for movement toward and away from said base.

3. A dish carrier as claimed in claim 1 further comprising a handle adapted to be releasibly attached to upper ends of said arms of one of said wires.

4. A dish carrier as claimed im claim 3 wherein said upper ends of said wire arms are formed with inverted J-shaped hooks, and wherein said handle is formed of resilient wire formed with hook-shaped ends adapted to be releasibly coupled to said arm hooks.

5. A dish carrier as claimed in claim 1 wherein said base is formed with a slot in which a portion transversed by the bight of the other wire of one of said wire connecting bights resides.

6. A dish carrier as claimed in claim 1 further comprising means for supporting said dish carrier upon a surface, said means comprising a plurality of feet extending downwardly from the bottom surface of said base a distance greater than the extent of said mutually transversely extending bight portions of said resilient wires below said base lower surface.

7. A dish carrier as claimed in claim 1 wherein each of said arms is formed of an inverted U-shaped resilient wire having an outer strand located proximally to the periphery of said base and an inner strand located distally from said base periphery, said inner strand having a free end located closely adjacent an upper surface of said base for spring biased movement generally toward and away from said outer strand in response to being spread and unspread by the placement of dishes upon and removal of dishes from the base.

8. A dish carrier comprising a base having an upper surface and a lower surface, a set of resilient arms mounted to said base that extend upwardly, each of said arms comprised of an inverted U-shaped resilient wire having an outer strand located proximally to the periphery of said base and an inner strand located distally from said base periphery, said outer strand being mounted to said base and said inner strand having a free end located closely adjacent said base upper surface for spring biased movement generally toward and away from said outer strand in response to being spread and unspread by the placement and removal of dishes upon the base.

9. A stacked article carrier comprising first, second, third, and fourth resilient arms, means for maintaining said resilient arms in spaced substantially parallel relationship, said means comprising a first and second connecting member, said first connecting member extending from one end of said first resilient arm to the corresponding end of said second resilient arm and said second connecting member extending from one end of said third resilient arm to the corresponding end of said fourth resilient arm with a mid portion of said second connecting member crossing a mid portion of said first connecting member, and a base adapted to be supported by said connecting members with said resilient arms extending substantially perpendicularly from an upper surface of said base adjacent the edges thereof.

10. A stacked article carrier comprising first, second, third, and fourth resilient arms, means for maintaining said resilient arms in spaced substantially parallel relationship, said means comprising a first and second connecting member, said first connecting member extending from one end of said first resilient arm to the corresponding end of said second resilient arm and said second connecting member extending from one end of said third resilient arm to the corresponding end of said fourth resilient arm, and a base adapted to be supported by said connecting members with said resilient arms extending substantially perpendicularly from an upper surface of said base adjacent the edges thereof, said base having holes formed adjacent its edges, said holes being adapted to receive said resilient arms with said connecting members extending mutually transversely along a bottom surface of said base member.

11. A stacked article carrier as claimed in claim 9 wherein said first and second resilient arms and said first connecting member are integrally formed from a single piece of resilient wire and wherein said third and fourth resilient arms and said second connecting member are integrally formed from a single piece of resilient wire.

12. A stacked article carrier as claimed in claim 9 further comprising means for supporting the carrier upon a surface, said means comprising a plurality of feet extending downwardly from a bottom surface of said base member.

13. A stacked article carrier as claimed in claim 10 wherein said connecting members cross adjacent the bottom surface of said base and wherein said base further comprises means for preventing a bulge from being formed at the point of crossing of said connecting members that comprises a groove formed in the bottom surface of said base member in which a portion of one of said connecting members resides.

14. A stacked article carrier as claimed in claim 9 further comprising a cover adapted to be slidably mounted to said resilient arms for movement generally toward and away from said base.

15. A stacked article carrier as claimed in claim 9 wherein each of said resilient arms has an outer strand adjacent an edge of said base and connected at one end to said connecting member and an inner strand located distal said base edge and being substantially parallel to said outer strand and connected to the other end of said outer strand, said inner strand having a free end located closely adjacent said base for spring biased movement generally toward and away from said outer strand in response to articles being placed and removed from said base.

16. A stacked article carrier as claimed in claim 9 wherein each of said resilient arms has an outer strand located adjacent an edge of said base and connected at one strand end to said connecting member, an intermediate stand located inwardly with respect to said base edge of said outer strand and being substantially parallel to said outer strand and connected at one strand end to the other end of said outer strand, and an inner strand located inwardly of said intermediate strand and being substantially parallel to said intermediate strand and connected at one strand end to the other end of said intermediate strand, said inner strand having a free end located distal said base for spring biased movement generally toward and away from said outer strand in response to articles being placed and removed from said base.

* * * * *